US011148732B2

(12) United States Patent
Hermann

(10) Patent No.: US 11,148,732 B2
(45) Date of Patent: Oct. 19, 2021

(54) INDUSTRIAL VEHICLE CAB COMPRISING A STEP LIGHTING SYSTEM, A BODY COMPONENT WITH A LIGHTING SYSTEM, AND ASSOCIATED INDUSTRIAL VEHICLE

(71) Applicant: Volvo Truck Corporation, Gothenburg (SE)

(72) Inventor: Olivier Hermann, Saint Maurice sur Dargoire (FR)

(73) Assignee: Volvo Truck Corporation, Gothenburg (SE)

( * ) Notice: Subject to any disclaimer, the term of this patent is extended or adjusted under 35 U.S.C. 154(b) by 160 days.

(21) Appl. No.: 16/604,246

(22) PCT Filed: May 22, 2017

(86) PCT No.: PCT/IB2017/000799
§ 371 (c)(1),
(2) Date: Oct. 10, 2019

(87) PCT Pub. No.: WO2018/215810
PCT Pub. Date: Nov. 29, 2018

(65) Prior Publication Data
US 2020/0156712 A1    May 21, 2020

(51) Int. Cl.
*B62D 25/02*    (2006.01)
*B62D 33/06*    (2006.01)
(Continued)

(52) U.S. Cl.
CPC ........... *B62D 33/06* (2013.01); *B60Q 1/0041* (2013.01); *B60Q 1/04* (2013.01); *B60Q 1/24* (2013.01);
(Continued)

(58) Field of Classification Search
CPC .. B62D 35/001; B62D 35/005; B62D 35/008; B62D 33/06; B62D 25/00; B62D 25/02;
(Continued)

(56) References Cited

U.S. PATENT DOCUMENTS 3,907,357 A * 9/1975 Davis, Jr. .................. B60R 3/00
296/146.5
4,366,530 A * 12/1982 Milhous ................... B60H 1/26
180/89.1
(Continued)

FOREIGN PATENT DOCUMENTS

DE    7911535 U1    9/1979
DE    4119436 A1    2/1993
(Continued)

OTHER PUBLICATIONS

International Search Report and Written Opinion for International Patent Application No. PCT/IB2017/000799, dated Mar. 6, 2018, 14 pages.

*Primary Examiner* — Gregory A Blankenship
(74) *Attorney, Agent, or Firm* — Withrow & Terranova, PLLC

(57) ABSTRACT

The invention relates to an industrial vehicle cab (5) defining a driver compartment and having a front wall and two side walls, said walls including rigid body components (20, 20*a*). The cab (5) comprises a side door (15) for entering the driver compartment, a step (11) arranged on a side wall for allowing the driver to climb up to/get down from the driver compartment, and a lighting system (30) for illuminating the step (11). The lighting system (30) is fastened on at least one body component (20). The lighting system (30) is located forward of the step (11) and along at least a portion of the step (11) in the vertical direction, and it is arranged to provide a light beam (31) towards at least part (41) of the
(Continued)

step (11) and towards an area (42) of the ground at the bottom of the step (11).

17 Claims, 4 Drawing Sheets

(51) Int. Cl.
  *B60R 3/00* (2006.01)
  *B60R 11/00* (2006.01)
  *B60Q 1/24* (2006.01)
  *B60Q 1/00* (2006.01)
  *B60Q 1/04* (2006.01)
  *B62D 35/00* (2006.01)
(52) U.S. Cl.
  CPC .............. *B60R 3/00* (2013.01); *B62D 25/02* (2013.01); *B62D 35/005* (2013.01); *B60R 2011/004* (2013.01)
(58) Field of Classification Search
  CPC ..... B60R 3/00; B60R 2011/004; B60Q 1/323; B60Q 1/0041; B60Q 1/0035; B60Q 1/2619; B60Q 1/0408; B60Q 1/0458; B60Q 1/16; B60Q 1/24; B60Q 1/26; B60Q 1/2661
  USPC ......... 296/190.01, 190.08; 180/89.13, 89.16, 180/89.19
  See application file for complete search history.

(56) References Cited

U.S. PATENT DOCUMENTS

| | | | |
|---|---|---|---|
| 6,416,209 B1 * | 7/2002 | Abbott | B60Q 1/323 |
| | | | 362/327 |
| 9,233,722 B1 * | 1/2016 | Bixby | B60R 3/00 |
| 9,593,820 B1 * | 3/2017 | Salter | F21S 43/249 |
| 9,802,545 B1 * | 10/2017 | Salter | B60Q 1/0023 |
| 10,457,217 B1 * | 10/2019 | Lingerfelt | E05B 85/00 |
| 2014/0252798 A1 * | 9/2014 | Angelo | B60R 3/00 |
| | | | 296/180.2 |
| 2015/0015027 A1 * | 1/2015 | Wirth | B62D 35/001 |
| | | | 296/180.2 |
| 2016/0185299 A1 | 6/2016 | Kawashiri et al. | |
| 2016/0272107 A1 * | 9/2016 | Kao | B60Q 1/0041 |
| 2019/0078373 A1 * | 3/2019 | Schulz | B60Q 1/0023 |
| 2020/0086796 A1 * | 3/2020 | Berne | B60Q 1/24 |
| 2020/0156712 A1 * | 5/2020 | Hermann | B60Q 1/24 |
| 2020/0207259 A1 * | 7/2020 | Reinken | B60Q 1/263 |

FOREIGN PATENT DOCUMENTS

| | | | | |
|---|---|---|---|---|
| DE | 102006040717 A1 * | 3/2008 | ............ | B60Q 1/323 |
| DE | 102007006263 A1 | 8/2008 | | |
| JP | H08104169 A | 4/1996 | | |
| JP | 2004338566 A | 12/2004 | | |
| JP | 2007244233 A | 9/2007 | | |
| WO | 2014126511 A1 | 8/2014 | | |

* cited by examiner

INDUSTRIAL VEHICLE CAB COMPRISING A STEP LIGHTING SYSTEM, A BODY COMPONENT WITH A LIGHTING SYSTEM, AND ASSOCIATED INDUSTRIAL VEHICLE

This application is a 35 USC 371 national phase filing of International Application No. PCT/IB2017/000799, filed May 22, 2017, the disclosure of which is incorporated herein by reference in its entirety.

TECHNICAL FIELD

The invention relates to an industrial vehicle cab comprising a step lighting system, a body component of an industrial vehicle cab comprising a step lighting system, and to an industrial vehicle comprising such a cab or such a body component.

The invention can be applied to several industrial vehicles, such as trucks, buses and construction equipment.

BACKGROUND

An industrial vehicle cab defines a driver compartment the floor of which is generally located fairly high relative to the ground. As a consequence, such a cab generally comprises a step arranged on a side wall of the cab, for allowing the driver to climb up to/get down from the driver compartment.

Using the step requires caution from the driver, especially when it's dark, to avoid falls and injuries. To lower the risks, cabs can be equipped with a lighting system for illuminating the step. However, conventional lighting systems are not fully satisfactory in terms of lighting efficiency, compactness and cost, among others.

SUMMARY

An object of the invention is to provide an improved step lighting system for an industrial vehicle cab.

To that end, according to a first aspect, the invention relates to an industrial vehicle cab defining a driver compartment and having a front wall and two side walls, said walls including rigid body components, the cab comprising a side door for entering the driver compartment, a step arranged on a side wall for allowing the driver to climb up to/get down from the driver compartment, and a lighting system for illuminating the step, wherein the lighting system is fastened on at least one body component, said lighting system being located forward of the step and along at least a portion of the step in the vertical direction, the lighting system being arranged to provide a light beam towards at least part of the step and towards an area of the ground at the bottom of the step.

Having a lighting system which is fixed relative to the cab structure provides several advantages.
- the invention makes it possible to provide a light beam having an appropriate direction whatever the door position, in contrast to a lighting system which would be fastened to a mobile component, such as the door or a mirror fastened to the door;
- being installed in or on a body component, the lighting system can take up less space and be less prominent, which reduces the risk that the lighting system be damaged and does not impair aerodynamics;
- a high lighting efficiency can be achieved without dazzling the person using the step.

Another advantage of the invention lies in the fact that the lighting system is located and designed to further illuminate an area of the ground at the bottom of the step, which further enhances the driver's safety. In other words, the light beam is directed towards the rear and towards the bottom.

It has to be noted that a body component is a part of the rigid envelope of the cab. It can typically form a panel (its shape not being restricted to a flat piece). Therefore, said body component is distinct from a vehicle headlamp or any part of a vehicle headlamp such as the front glass, and is also distinct from a cab mirror. A body component can be an opaque piece.

According to an embodiment, the lighting system is housed in said body component. Alternatively, the lighting system can be mounted on the body component, but located outside said body component.

Said body component may form an air deflector located around the cab edge formed between the front wall and the side wall.

According to an embodiment, said body component comprises a side panel having a rear wall through which the light beam provided by the lighting system is emitted. This side panel can be curved. If the lighting system is mounted on and outside the body component, then the light beam is directed from the rear wall rearwards and downwards, without passing through the rear wall. Said body component can further comprise a front elongated portion which extends from the bottom part of the side panel and is angled relative to said side panel.

According to an embodiment, the cab further comprises a headlamp, and said body component partially boarders the headlamp.

The lighting system can comprise at least one light source, and preferably a light deflector which can form part of a rear wall of the body component. The light deflector is arranged on the path of the beam emitted by the light source(s), and is designed to deviate the light so as to ultimately provide a beam capable of illuminating the desired area. According to an embodiment, the lighting system comprises several light sources which are substantially vertically aligned.

According to an embodiment, the cab door has a substantially vertical hinge axis, and the lighting system is located forward of and close to said hinge axis along the longitudinal direction, and below, preferably close to, the driver compartment floor along the vertical direction. This lighting system location allows providing a particularly efficient lighting of the step and ground area at the bottom of the step.

The cab can further comprise an opening for entering the driver compartment, the step being located below said opening, the door having a main portion for closing said opening and a bottom portion covering an upper part of the step. Then, the lighting system can extend along the vertical direction at least partially along the door bottom portion. In practice, the lighting system can extend over the door whole bottom portion or only a portion of said door bottom portion, or can extend below the door bottom portion. For example, if the step has three levels, the door bottom portion can cover at least the upper level.

According to an embodiment, the lighting system is designed to provide a light beam which substantially forms an angular sector, in a horizontal plane, defined between:
- an outer line extending outwardly and forming an angle $\alpha 1$ with the longitudinal direction, $\alpha 1$ ranging from 50° to 70°;
- an inner line extending inwardly and forming an angle $\alpha 2$ with the longitudinal direction, $\alpha 2$ ranging from 70° to 90°;

The term "inwardly" means towards the longitudinal symmetrical axis of the cab.

According to an embodiment, the lighting system is designed to provide a light beam which, in a longitudinal vertical plane, is defined between:
- an upper line extending downwards from the top of the lighting system and forming an angle $\beta 1$ with the longitudinal direction, $\beta 1$ ranging from 0° to 20°;
- a lower line extending downwards from the bottom of the lighting system and forming an angle $\beta 2$ with the longitudinal direction, $\beta 2$ ranging from 70° to 90°.

According to a second aspect, the invention relates to a body component for forming part of a front wall and a side wall of an industrial vehicle cab, the body component being rigid and comprising a side panel having a rear wall and a front elongated portion which extends from the bottom part of the side panel and is angled relative to said side panel, wherein said body component further comprises a lighting system including at least one light source and preferably a light deflector, the lighting system being mounted on the side panel or housed therein and being arranged to provide a light beam directed rearwards and downwards from the side panel rear wall, in the operative position.

The terms defining locations or orientations (such as "front", "side", "rear" and the like) are used relative to the vehicle cab, in the operative position of the body component, i.e. when the body component is mounted on the vehicle cab.

In an embodiment, the lighting system comprises several light sources which are substantially aligned along the side panel rear wall, along a vertical direction in the operative position.

The lighting system can be designed to provide a light beam:
- which substantially forms an angular sector, in a plane orthogonal to the side panel rear wall, having an angle ranging from 120° to 160°;
- and/or which substantially forms an angular sector, in a plane substantially parallel to the side panel, having an angle ranging from 50° to 90°.

According to an embodiment, the body component is designed to form an air deflector located around the cab edge formed between the front wall and the side wall. Its shape can be designed to fit at least part of the periphery of a vehicle headlamp. Furthermore, it can be designed to provide an air channel for air flowing rearwards.

According to a second aspect, the invention relates to an industrial vehicle which comprises a cab as previously described, or a body component as previously described.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
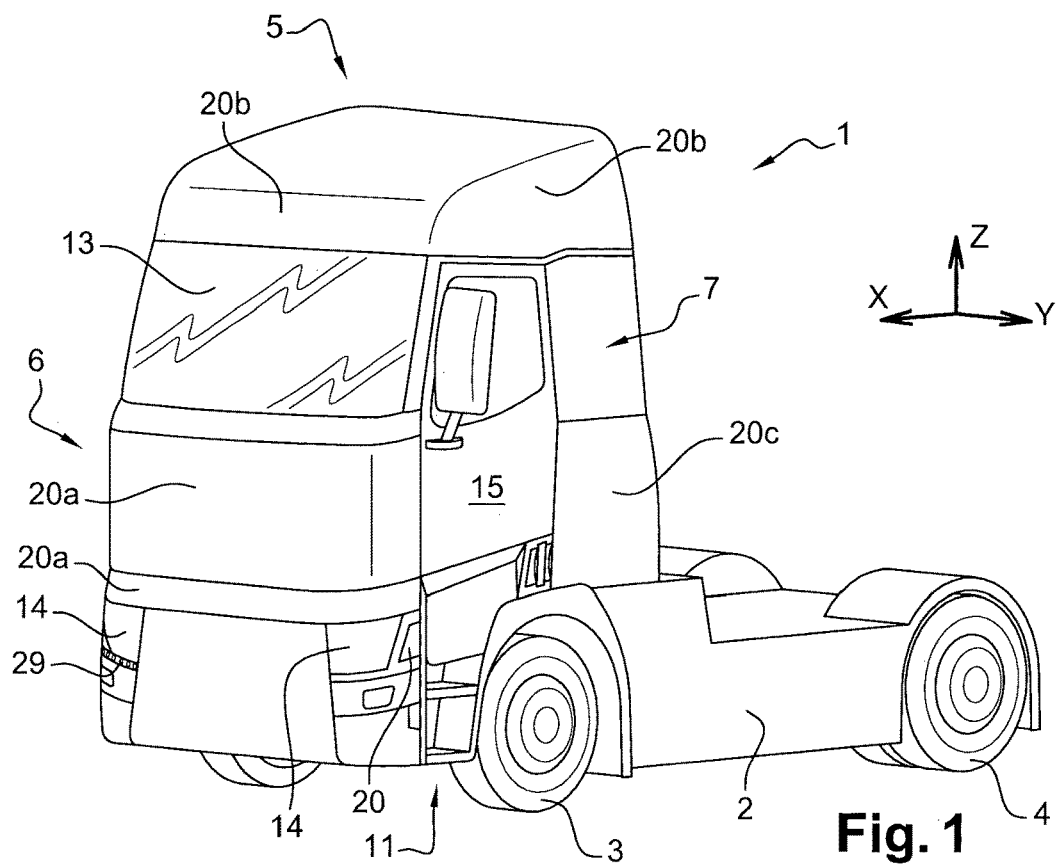
FIG. 1 is a perspective view of an industrial vehicle cab according to an embodiment of the invention.

FIG. 1 shows a vehicle 1, more specifically an industrial vehicle. Although the invention will be described with respect to a truck, the invention is not restricted to this particular vehicle, but may also be used in other vehicles, such as a bus.

The vehicle 1 comprises a frame 2 supported by front wheels 3 and rear wheels 4 as well as a cab 5. The vehicle 1 can further comprise a cargo body (not shown). Z is defined as the vertical direction, X is defined as the longitudinal direction of the vehicle 1, and Y is defined as the transversal direction of the vehicle 1.

Figure 7:
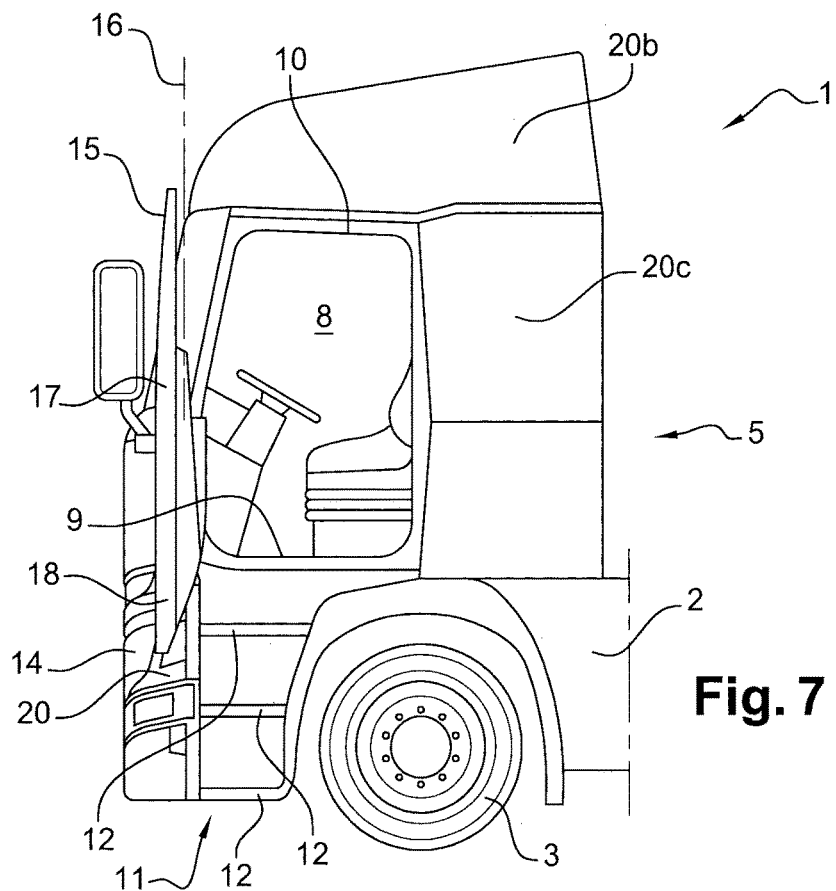
FIG. 7 is a view similar to FIG. 2, the side door being open.

The cab 5 has a front wall 6 and two side walls 7. It defines a driver compartment 8 having a floor 9, and comprises an opening 10 for entering the driver compartment 8, as shown on FIG. 7. As the floor 9 is located fairly high above the ground, the cab 5 comprises a step 11 arranged on a side wall 7 for allowing the driver to climb up to/get down from the driver compartment 8. In the illustrated embodiment, the step 11 includes three levels 12, but this should not be considered as limitative. The step 11 can be located below the opening 10, forward of the front wheels 3.

Figure 2:
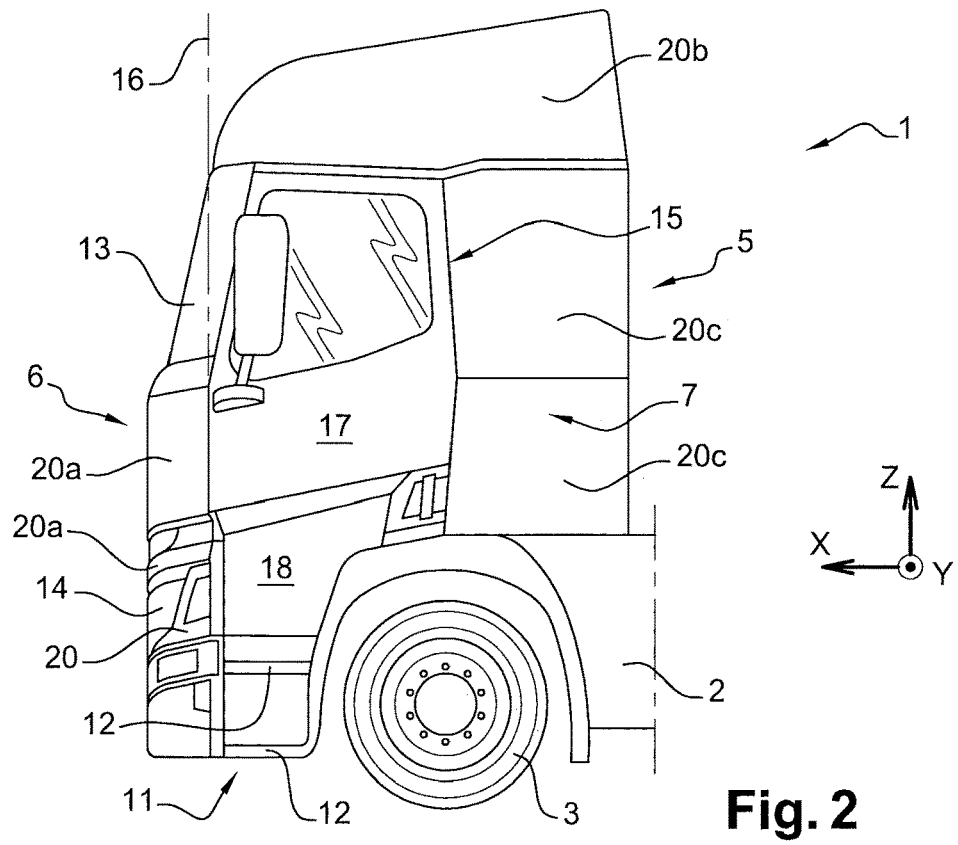
FIG. 2 is a side view of the vehicle cab of FIG. 1, the side door being closed.

The cab 5 comprises a side door 15 which has a substantially vertical hinge axis 16. Thus, the door 15 can pivot between a close position, in which it closes the opening 10 (FIGS. 1 and 2), and an open position (FIG. 7), for allowing a person to enter the driver compartment 8. The door 15 can comprise a main portion 17 for closing said opening 10 and a bottom portion 18 for covering an upper part of the step 11, such as the part of the step 11 extending down to the upper level 12 (see FIG. 2).

The front wall 6 and side walls 7 of the cab 5 include rigid body components which can be metallic panels, generally opaque, forming part of the rigid envelope of the cab. Such body components can further have aerodynamic purposes. Some body components are listed hereinafter: front body components 20a located between a windshield 13 and headlamps 14, body components 20b forming roof portions, side body components 20c, a body component 20 located close to one headlamp 14.

The cab 5 further comprises a lighting system 30 for illuminating the step 11.

Figure 6:
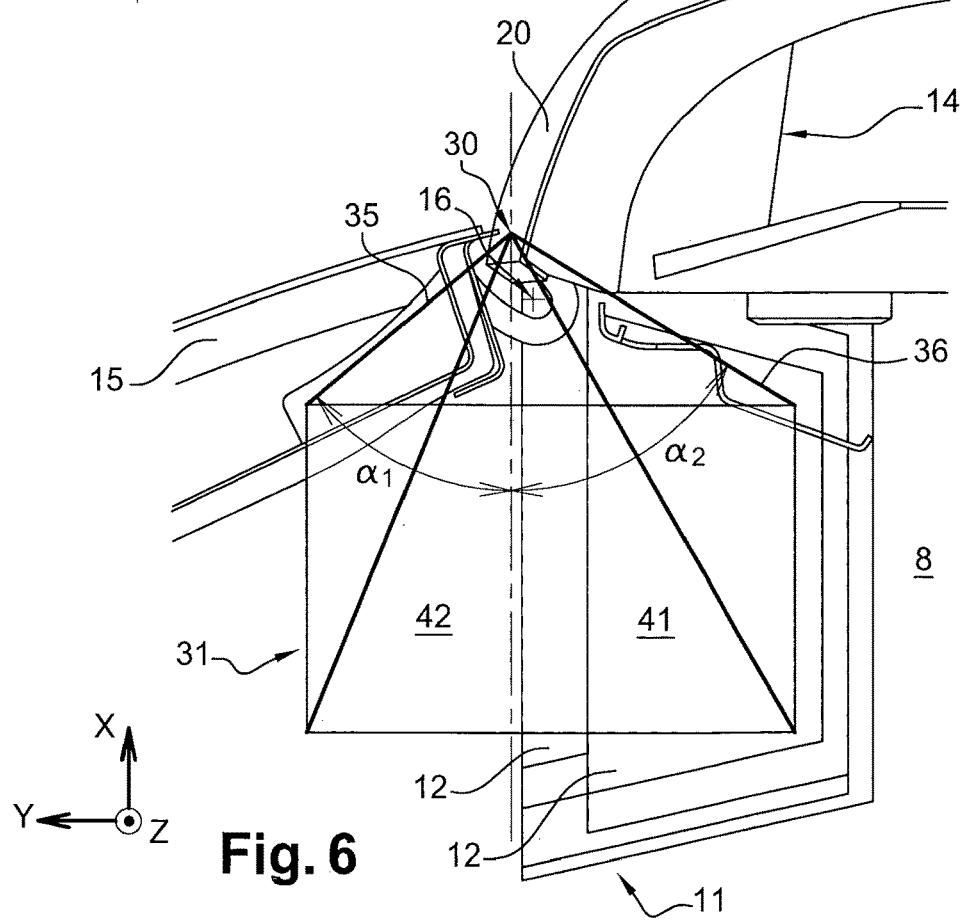
FIG. 6 is a schematic cross-sectional view of the vehicle cab in a horizontal plane, showing the light beam provided by the lighting system.
Figure 8:
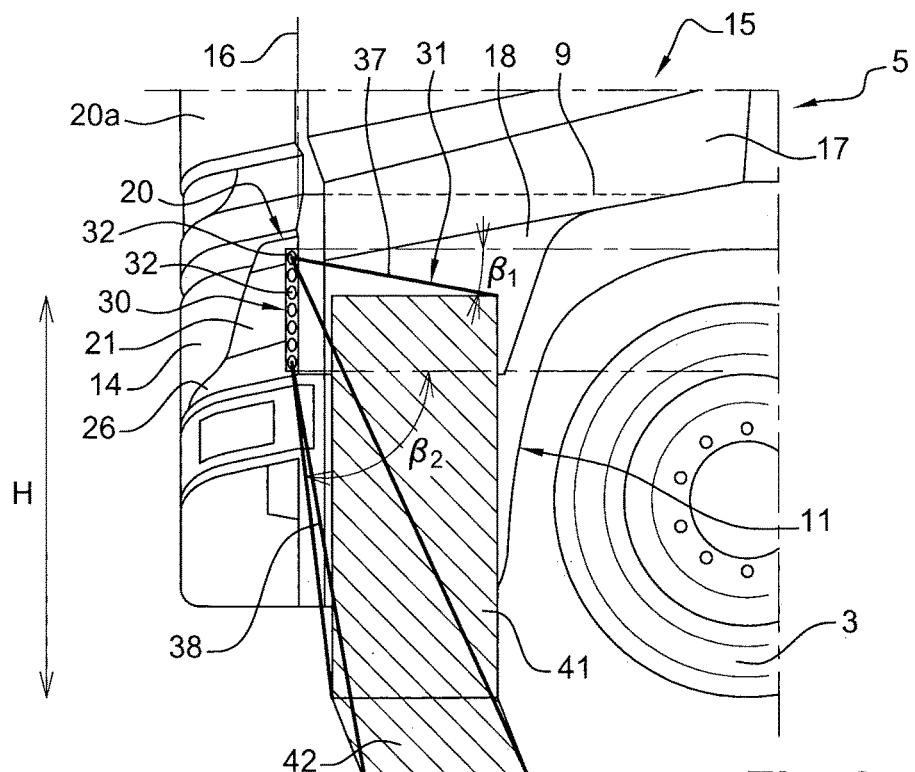
FIG. 8 is a schematic side view of the vehicle cab, showing the light beam provided by the lighting system.

According to the invention, said lighting system 30 is fastened on at least one body component, and is arranged to provide a light beam 31 towards at least an area 41 of the step 11 and towards an area 42 of the ground at the bottom of the step 11 (see FIGS. 6 and 8). For that purpose, the lighting system 30 is located forward of the step 11 and along at least a portion of the step 11 in the vertical direction Z. The terms "along at least a portion of the step in the vertical direction" do not limit the invention to a configuration in which the lighting system extends vertically.

According to an embodiment, as shown on the figures, the body component on which is fastened the lighting system 30 is the above mentioned body component 20. This body component 20 forms an air deflector located around the cab edge formed between the front wall 6 and the side wall 7, and can partially boarder the headlamp 14, especially on the rear edge and on the lower edge of said headlamp 14.

The body component 20 is now described with reference to FIGS. 3 and 4.

The body component 20 comprises a side panel 21 which, when mounted on the vehicle 1, is located on the side wall 7. Preferably, as best seen on FIG. 5, the side panel 21 is not flat but slightly curved, to fit the rounded shape of the cab vertical front edge and to improve aerodynamics. The side panel 21 can substantially have the shape of a trapezoid. It has a rear wall 22 which is substantially vertical and arranged in a plane (Y,Z). It can further have a substantially horizontal upper edge 23, a longer lower edge 24 inclined forward and downward, and a front edge 25 inclined forward and downward between the upper and lower edges 23, 24.

The body component 20 further comprises a front elongated portion 26 which extends from the bottom part of the side panel 21 and is angled relative to said side panel 21, so as to form part of the front wall 6, when mounted on the vehicle 1. The front elongated portion 26 can have a lower edge 27 merging with the lower edge 24 of the body component side panel 21, and an upper edge 28 which can be substantially parallel to the lower edge 27 or slightly converge towards said lower edge 27. In the front elongated portion 26 can be arranged light sources 29 (see FIG. 1) acting as position indicators. Thus, the front part of the front elongated portion 26 facing the light sources 29 is transparent or translucent.

Figure 3:
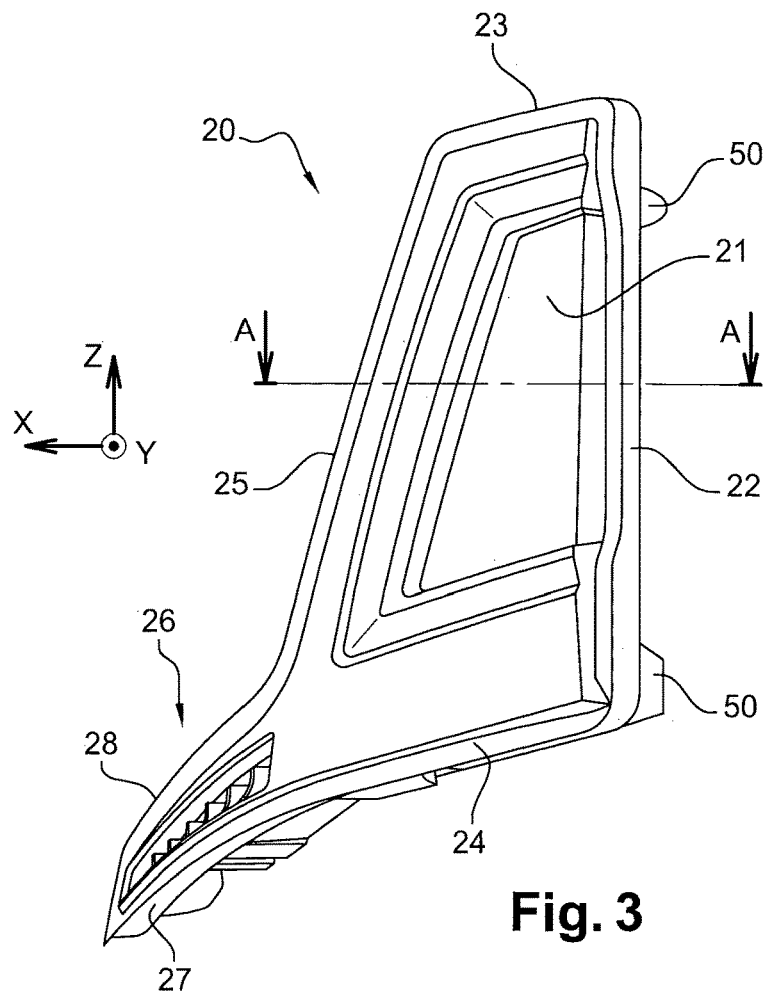
FIGS. 3 and 4 are side views of a body component of the vehicle cab, from the outside and from the inside, respectively, the body component comprising a lighting system.
Figure 4:
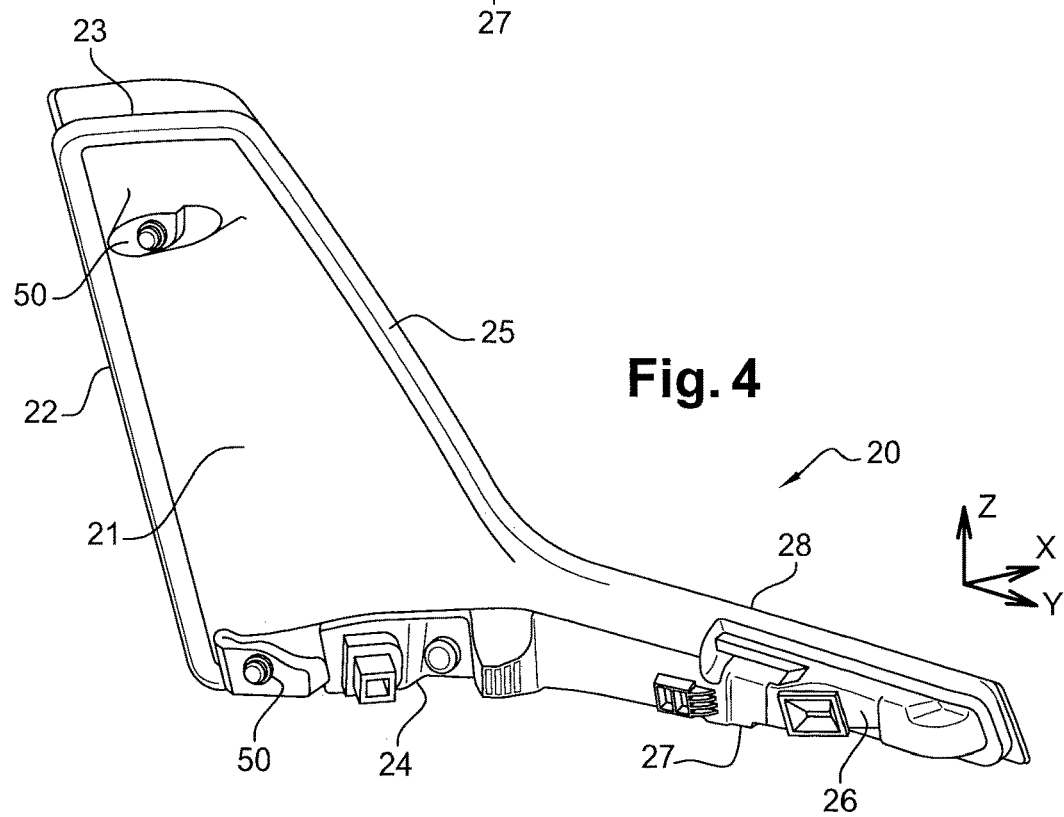

As illustrated on FIGS. 3 and 4, the inner wall of the body component 20 is provided with fastening devices 50 for assembling the body component 20 to the cab 5. There may be provided a horizontal gap between the body component inner wall and the cab 5 so as to form a channel in which air can flow rearwards.

According to an embodiment, the shape of the body component 20 is designed to fit at least part of the periphery of one of the vehicle headlamps 14. More specifically, the shape of the side panel front edge 25 can be similar to the shape of the headlamp rear edge, while the shape of the front elongated portion upper edge 28 can be similar to the shape of the headlamp lower edge.

In the illustrated embodiment, the lighting system 30 is housed in said body component 20. Alternatively, it could be envisaged to fasten the lighting system 30 on and outside the body component 20. Arranging the lighting system 30 on/in an existing component of the cab 5 contributes to providing a cost efficient solution.

Figure 5:
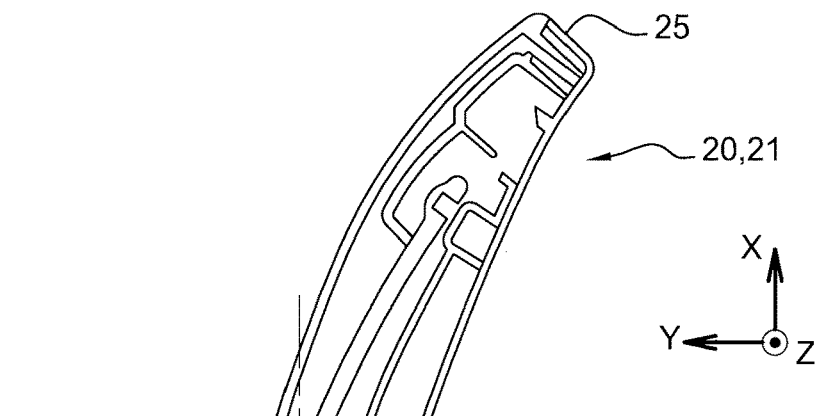
FIG. 5 is a schematic cross-sectional view of the body component of FIG. 3 in a horizontal plane, along line AA of FIG. 3, showing the light beam provided by the lighting system.

The lighting system 30 includes at least one light source 32, which can be mounted on a support 33 including a printed circuit board (not shown), and a light deflector 34. More precisely, the lighting system 30 is housed in the side panel 21 so that the light beam 31 provided by the lighting system 30 is emitted through the side panel rear wall 22, said light beam 31 being directed rearwards and downwards, in the operative position. Thus, the part of the rear wall 22 which faces the light source(s) 32 is transparent or translucent. As shown in FIG. 5, the light deflector 34 can form part of the body component rear wall 22. In an embodiment, as shown in FIG. 8, the lighting system 30 comprises several light sources 32 which are substantially vertically aligned. The light source(s) 22 can typically be LEDs.

In an embodiment, as shown in FIG. 8, the lighting system 30 is located forward of and close to the door hinge axis 16 along the longitudinal direction X, and below, preferably close to, the driver compartment floor 9 along the vertical direction Z. Furthermore, the lighting system 30 can extend along the vertical direction Z at least partially along the door bottom portion 18. Such an arrangement is advantageous because the light beam 31 can be emitted between the door 15 and the cab 5, through the hinge area, and below the door 15. Moreover, the light sources 32 are located near the step 11. This results in a very effective lighting of the step 11 and the ground area located at the bottom of the step 11. In practice, the height H of the light sources 32 can range from 800 mm to 1500 mm relative to the ground (see FIG. 8).

Besides, in order to provide a light beam 31 capable of efficiently illuminating the required area, the lighting system 30 can be designed as explained below. In practice, this can be achieved by an appropriate design of the light deflector 34.

On the one hand, as shown in FIGS. 5 and 6, the light beam 31 can form an angular sector, in a horizontal plane, defined between:
- an outer line 35 extending outwardly and forming an angle $\alpha 1$ with the longitudinal direction X, $\alpha 1$ ranging from 50° to 70°;
- an inner line 36 extending inwardly and forming an angle $\alpha 2$ with the longitudinal direction X, $\alpha 2$ ranging from 70° to 90°.

The term "inner" refers to a part located closer to the vehicle longitudinal axis of symmetry, as opposed to the term "outer".

In other words, the light beam 31 can form an angular sector, in a plane orthogonal to the side panel rear wall, having an angle ranging from 120° to 160°.

On the other hand, as shown in FIG. 8, in a longitudinal vertical plane, the light beam 31 can be defined between:
- an upper line 37 extending downwards from the top of the lighting system 30 and forming an angle $\beta 1$ with the longitudinal direction X, $\beta 1$ ranging from 0° to 20°;
- a lower line 38 extending downwards from the bottom of the lighting system 30 and forming an angle $\beta 2$ with the longitudinal direction X, $\beta 2$ ranging from 70° to 90°.

In other words, the light beam 31 can form an angular sector, in a plane substantially parallel to the side panel 21—i.e. substantially parallel to a plane (X,Z)—having an angle ranging from 50° to 90°.

For example, $\alpha 1$ can be around 60°, $\alpha 2$ can be around 80°; $\beta 1$ can be around 10°, $\beta 2$ can be around 85°.

The lighting system 30 can be arranged on one side of the cab 5, preferably on the driver's side, or on both sides of the cab 5. The lighting system 30 can be controlled to be automatically activated, only when the door 15 is open, in dark conditions.

It is to be understood that the present invention is not limited to the embodiments described above and illustrated in the drawings; rather, the skilled person will recognize that many changes and modifications may be made within the scope of the appended claims.

The invention claimed is:

1. An industrial vehicle cab defining a driver compartment and comprising:
    a front wall and two side walls, the walls including rigid body components,
    a side door for entering the driver compartment,
    a step arranged on a side wall for allowing a driver to climb up to/get down from the driver compartment, and a lighting system for illuminating the step, the lighting system being fastened on at least one body component, the lighting system being located forward of the step and along at least a portion of the step in a vertical direction, the lighting system being arranged to provide a light beam towards at least part of the step and towards an area of a ground at the bottom of the step and the body component comprises a side panel having a rear wall through which the light beam provided by the lighting system is emitted.

2. The cab of claim 1, wherein the lighting system is housed in the body component.

3. The cab of claim 1, wherein the body component forms an air deflector located around a cab edge formed between the front wall and the side wall.

4. The cab of claim 1, wherein the body component further comprises a front elongated portion which extends from a bottom part of the side panel and is angled relative to the side panel.

5. The cab of claim 1, further comprising a headlamp, and wherein the body component partially borders the headlamp.

6. The cab of claim 1, wherein the lighting system comprises at least one light source.

7. The cab of claim 1, wherein the lighting system comprises several light sources which are substantially vertically aligned.

8. The cab of claim 1, wherein the door has a substantially vertical hinge axis, the lighting system being located forward of and close to the hinge axis along the longitudinal direction, and below the driver compartment floor along the vertical direction.

9. The cab of claim 1, further comprising an opening for entering the driver compartment, the step being located below the opening, the door having a main portion for closing the opening, and a bottom portion covering an upper part of the step, wherein the lighting system extends along the vertical direction at least partially along the door bottom portion.

10. The cab of claim 1, wherein the lighting system is designed to provide a light beam, which substantially forms an angular sector, in a horizontal plane, defined between:
    an outer line extending outwardly and forming an angle $\alpha 1$ with the longitudinal direction, $\alpha 1$ ranging from 50° to 70°;
    an inner line extending inwardly and forming an angle $\alpha 2$ with the longitudinal direction, $\alpha 2$ ranging from 70° to 90°.

11. The cab of claim 1, wherein the lighting system is designed to provide a light beam which, in a longitudinal vertical plane, is defined between:
    an upper line extending downwards from the top of the lighting system and forming an angle $\beta 1$ with the longitudinal direction, $\beta 1$ ranging from 0° to 20°;
    a lower line extending downwards from the bottom of the lighting system and forming an angle $\beta 2$ with the longitudinal direction, $\beta 2$ ranging from 70° to 90°.

12. A body component for forming part of a front wall and a side wall of an industrial vehicle cab, the body component being rigid and comprising:
    a side panel having a rear wall and a front elongated portion which extends from the bottom part of the side panel and is angled relative to the side panel, and
    a lighting system including at least one light source, the lighting system being mounted on the side panel or housed therein and being arranged to provide a light beam directed rearwards and downwards from the side panel rear wall, in an operative position.

13. The body component of claim 12, wherein the lighting system comprises several light sources which are substantially aligned along the side panel rear wall, along a vertical direction in the operative position.

14. The body component of claim 12, wherein the lighting system is designed to provide a light beam, which substantially forms an angular sector, in a plane orthogonal to the side panel rear wall, having an angle ranging from 120° to 160°.

15. The body component of claim 12, wherein the lighting system is designed to provide a light beam which substantially forms an angular sector in a plane substantially parallel to the side panel, having an angle ranging from 50° to 90°.

16. The body component of claim 12, wherein the body component is designed to form an air deflector located around the cab edge formed between the front wall and the side wall.

17. The body component of claim 12, wherein a shape of the body component is designed to fit at least part of a periphery of a vehicle headlamp.

* * * * *